United States Patent [19]

Kennedy

[11] Patent Number: 4,505,951

[45] Date of Patent: Mar. 19, 1985

[54] METHOD FOR MAKING A POLYVINYLIDENE CHLORIDE COATED BIAXIALLY ORIENTED POLYETHYLENE TEREPHTHALATE CONTAINER

[75] Inventor: Leo J. Kennedy, Toledo, Ohio

[73] Assignee: Owens-Illinois, Inc., Toledo, Ohio

[21] Appl. No.: 516,065

[22] Filed: Jul. 18, 1983

[51] Int. Cl.³ .................... B05D 3/02; B05D 3/06; B32B 27/06; B32B 27/36
[52] U.S. Cl. .................... 427/55; 427/374.1; 427/393.5; 428/35; 428/483
[58] Field of Search .................... 427/55, 374.1, 374.3, 427/393.5; 428/35, 483

[56] References Cited

U.S. PATENT DOCUMENTS

| | | | |
|---|---|---|---|
| 3,057,752 | 10/1962 | Couington et al. | 427/374.1 |
| 3,398,016 | 8/1968 | Goldman et al. | 427/55 |
| 3,458,334 | 7/1969 | Wallenfels | 427/374.1 X |

*Primary Examiner*—Michael R. Lusignan
*Attorney, Agent, or Firm*—Thomas L. Farquer; M. E. Click

[57] ABSTRACT

A method for coating an oriented polyethylene terephthalate container with a coating of polyvinylidene chloride from a water based emulsion, the coating being dried with infra-red energy and cooling air to prevent undesirable shrinkage of the container and prevent formation of a skin on the coating which would entrap water.

6 Claims, No Drawings

METHOD FOR MAKING A POLYVINYLIDENE CHLORIDE COATED BIAXIALLY ORIENTED POLYETHYLENE TEREPHTHALATE CONTAINER

The present invention relates to a method for coating an oriented polyethylene terephthalate (PET) container with polyvinylidene chloride.

In the past, when applying a water-based emulsion of polyvinylidene chloride to an oriented polyterephthalate container and drying the coating by convection and/or circulating air, often the oriented container has shrunk because of the elevated temperatures and, sometines, an undesirable skin has formed on the coating that apparently prematurely seals the coating surface and entraps unexpelled water therein.

It is an object of the present invention to provide a method of applying and drying a coating of polyvinylidene chloride from a water-based emulsion, the coating being on a heat-sensitive oriented polyethylene terephthalate bottle without shrinking the heat-sensitive bottle and without prematurely forming an outer skin on the coating which would entrap water in the coating.

It is an object of the present invention to provide a method of making a polyvinylidene chloride coated biaxially oriented polyethylene terephthalate container in which the container has improved barrier properties, the method comprising the steps of: applying a liquid water-based emulsion of polyvinylidene chloride on the surface of the biaxially oriented polyethylene terephthalate container to form a coating, drying the coating with infra-red light energy to remove the water, and cooling the coating with air while drying the coating, the temperature of the cooling air being sufficient to prevent undesirable shrinkage of the container while maximizing the removal of liquids without prematurely sealing the surface which would entrap unexpelled liquid.

These and other objects will become apparent from the specificatiion that follows and the appended claims.

The present invention provides an efficient method, well suited for production, for making an improved polyvinylidene chloride coated biaxially oriented polyethylene terephthalate (PET) container, the method including the steps of:

A. applying a water-based emulsion of polyvinylidene chloride on the outer surface of a biaxially oriented PET container that is preferably a blow mold carbonated beverage bottle ranging in a size from about ½ liter to 2 liters, to form a coating on the outside of the container, B. drying the coating with infra-red light energy to remove the water therefrom, and C. cooling the coating with air while drying the coating, the volume and temperature of the cooling air being sufficient to effectively prevent undesirable heat shrinkage of the PET container and to maximize the removal of water from the coating without prematurely sealing the coating surface to prevent equipment of unexpelled water in the coating.

The above novel process can also be used to coat a PET preform without undesirably heating the preform. The resultant preform can be readily blow molded to produce a container therefrom.

In the novel method of the present invention, the temperature of the cooling air is generally about 40° to 60° F. and preferably about 45° to 55° F. The volume of the cooling air passing over the surface of the drying coating is sufficient to prevent shrinkage of the PET container or preform and sufficient to prevent premature formation of a skin on the exposed surface of the coating. Generally, the volume of cooling air is about 100 to 400 cubic feet per minute and preferably about 300 to 350, with excellent results being obtained with about 325 cubic feet per minute.

The simultaneous use of infra-red energy and blowing cooling air on the coating of polyvinylidene chloride formed from a latex thereof, has provided an efficient method of providing a polyvinylidene chloride coating on heat-sensitive oriented PET containers.

In U.S. Pat. No. 3,254,422 to Defiel, a process is disclosed for forming an elastomeric polychloroprene sheet from a dip bath by running a web sheet through the bath. In column 3, a drying process for the rapidly soldifying polychloroprene sheet is mentioned, the drying including intense infra-red radiation with a simultaneous cool air current apparently to keep the temperature of the solidifying coagulated polychloroprene from reaching about 100°–150° C. The patent indicates that the problem faced by Defiel was the darkening of the solidifying plastic sheet and the sheet becoming unstable upon long term storage.

It is apparent that the problem facing Defiel is greatly different from the problems solved by the present invention. The solution of the problem solved by the present invention is not suggested in Defiel who worked with a solidifying rubbery polychlorprene rather than drying a very heat-sensitive oriented PET container coated with a thin layer of polyvinylidene latex prone to form an undesirable surface skin. Defiel did not face or solve the problem of handling a heat-sensitive substrate and a thin polyvinylidene chloride coating that forms an undesirable skin when subjected to a drying operation.

In the present invention, the walls of the preferred oriented PET bottles are only on the order of 8 or 10 up to 20 or 30 mils in thickness depending upon the size of the bottle such as ½ liter to 1 or 2 liters. The thickness of the polyvinylidene chloride coating that is dried is only about ½ to 1 up to 3 or 4 mils in thickness.

The preferred thickness (2 to 2½ mils) of the polyvinylchloride coating of the present invention is in sharp contrast to the much thicker solidifying rubbery polychloroprene of the Defiel patent which is stated to be 60 mils thick in Example 2 and 30 mils in Example 1.

In the present invention, the PET container sidewall is very heat-sensitive and only a 5° to 10° C. change can result in a marked shrinkage of the container. In the high speed production method of the present invention, the drying is quite quick and only 5 to 10 additional seconds can lead to shrinkage of the container and skin formation of the coating which can happen when not using the combination of infra-red heating and simultaneous cooling with air using a volume of about 100 to 400 cubic feet per minute.

The coatings can be applied by known means such as spraying, dipping, flow coating or the coatings can be rolled on.

The polyvinylidene chloride latex generally has a solids content of about 25 to 60% by weight and a viscosity of about 5 cps to 100 cps measured by a Brookfield LVT viscometer using a #1 spindle at 25° C. and 60 rpm.

Suitable polyvinylchloride latexes available commercially are sold under the trademarks Serfene 190, 411, 2015 and 2060 by Morton Chemical, under the trademarks Saran Latex XD-30653.00 and 30564.01 by Dow Chemical, and under the trademark Daran 820 by W. R. Grace & Co.

What is claimed is:

1. A method of making a polyvinylidene chloride coated biaxially oriented polyethylene terephthalate container in which the container has improved barrier properties, the method comprising the steps of: applying a liquid water-based emulsion of polyvinylidene chloride on the surface of the biaxially oriented polyethylene terephthalate container to form a coating, drying the coating with infra-red light energy to remove the water, and cooling the coating with air while drying the coating, the temperature of the cooling air about 40° F. to 60° F. and being sufficient to prevent undesirable shrinkage of the container while maximizing the removal of liquids without prematurely sealing the surface which would entrap unexpelled liquid.

2. A method of coating a polyethylene terephthalate preform with a barrier coating, the method comprising applying a water-based latex of polyvinylidene chloride to the outer surface of the preform which is adapted for producing a blown oriented container, and simultaneously heating the latex on the preform with infra-red light energy and cooling the latex and preform with cooling air at a temperature of about 40° to 60° F. to form a polyvinyldiene barrier coating on the preform without undesirably heating the preform while coating the same.

3. A method as defined in claim 1 in which: the temperature of the cooling air is equivalent to that of about 45° F. to 55° F. which maximizes the removal of liquids without prematurely sealing the surface of the polyvinylidene chloride coating with formation of an undesirable skin.

4. A method as defined in claim 1 in which the volume of cooling air is sufficient to cool the container to prevent shrinkage and sufficient to cool the coating to prevent surface skin from forming prematurely.

5. A method as defined in claim 1 in which the volume of cooling air is about 100 to 400 cubic feet per minute.

6. A method as defined in claim 1 in which the volume of cooling air is about 325 cubic feet per minute.

* * * * *